US008875282B2

United States Patent
Sinclair

(10) Patent No.: US 8,875,282 B2
(45) Date of Patent: Oct. 28, 2014

(54) ACCESSING A PROCESSING DEVICE

(75) Inventor: Colin A. Sinclair, Angus (GB)

(73) Assignee: NCR Corporation, Duluth, GA (US)

( * ) Notice: Subject to any disclaimer, the term of this patent is extended or adjusted under 35 U.S.C. 154(b) by 474 days.

(21) Appl. No.: 12/413,837

(22) Filed: Mar. 30, 2009

(65) Prior Publication Data
US 2010/0251360 A1 Sep. 30, 2010

(51) Int. Cl.
*G06F 7/04* (2006.01)
*G06F 21/34* (2013.01)
*H04L 9/32* (2006.01)
*G06F 21/35* (2013.01)

(52) U.S. Cl.
CPC .......... *H04L 9/32* (2013.01); *G06F 2221/2137* (2013.01); *G06F 21/34* (2013.01); *G06F 2221/2113* (2013.01); *G06F 21/35* (2013.01)
USPC ....... 726/19; 726/7; 726/9; 713/179; 713/185

(58) Field of Classification Search
CPC ........... H04L 9/32; G06F 21/34; G06F 21/35; G06F 2221/2137; G06F 2221/2113
See application file for complete search history.

(56) References Cited

U.S. PATENT DOCUMENTS

| 7,775,429 B2 * | 8/2010 | Radicella et al. | 235/380 |
| 2003/0088780 A1 * | 5/2003 | Kuo et al. | 713/185 |
| 2003/0204733 A1 * | 10/2003 | Krulce | 713/183 |
| 2005/0193182 A1 * | 9/2005 | Anderson et al. | 711/163 |
| 2006/0010131 A1 * | 1/2006 | Chisholm et al. | 707/9 |
| 2006/0242423 A1 * | 10/2006 | Kussmaul | 713/182 |
| 2007/0006298 A1 * | 1/2007 | Malone et al. | 726/17 |
| 2007/0205861 A1 * | 9/2007 | Nair et al. | 340/5.61 |

FOREIGN PATENT DOCUMENTS

GB 2360616 * 3/2000

* cited by examiner

*Primary Examiner* — Shewaye Gelagay
(74) *Attorney, Agent, or Firm* — Joseph P. Mehrle

(57) ABSTRACT

The invention relates to a method of controlling access to a processing device using an access token with a machine readable identity. The method comprises reading the identity of the access token at the location of the processing device and querying a database comprising valid identities of access tokens, wherein each identity is associated with an access permission level. If the identity is a valid identity, the method further comprises determining the associated level of access and allowing a level of access to the processing device according to the associated access permission level. In some embodiments, the processing device is an Automated Teller Machine (ATM).

20 Claims, 6 Drawing Sheets

| ID | LICENCE EXPIRY | LICENCE START | PASSWORD | PERMISSION LEVEL |
|---|---|---|---|---|
| A1892 | 10/10/2008 | 1/11/2007 | jhy7bH | BASIC |
| B1976 | 23/11/2009 | 10/1/2006 | mjn9bG | MASTER |
| C1987 | 31/10/2009 | 23/4/2007 | khd9nY | MASTER |

FIG. 5

ACCESSING A PROCESSING DEVICE

FIELD OF INVENTION

This invention relates to a method and apparatus for validating attempts to access a processing device. The processing device may be an Automated Teller Machine (ATM), or another processing device to which access must be carefully controlled.

BACKGROUND OF INVENTION

An Automated Teller Machine (ATM) is an example of a processing device to which access must be carefully controlled. Such machines are often the target of fraudsters due to the large amounts of money that they hold and the confidential nature of data supplied thereto, both in the form of customer entered Personal Identification Numbers and in the form of bank account details. However, ATMs must be accessible by engineers as they require regular maintenance, replacement of parts and updates to system software. Such maintenance is often carried out by "field engineers", who generally travel to the site of the ATMs for this purpose.

Access to ATMs is often controlled though the use of access tokens such as flex disks or key fobs which carry a machine readable identity in the form of a computer readable memory, a bar code, RFID tag or the like. In order to gain access to the interior workings of the machine, a field engineer would allow a data reader on the ATM to read data from his or her assigned access token and, providing that the access token was valid and within its set license period, the field engineer would be granted access to the ATM. In prior art devices, the license period was held on the access token in the form of a length of time (usually in months) and an expiry date.

This system was only secure as long as the access token remained in the care of the field engineer. In order to improve security, companies deploying ATMs began to require that a password also be entered. Under such a system, the access token must be valid, within its license period and a valid password would have to be supplied before a field engineer is granted access to the ATM.

In some existing systems, two types of access token were issued. A trusted group (for example, employees of the ATM company) were provided with an access token allowing 'Master' level access and a less trusted group (for example, third party maintenance engineers) were provided with an access token allowing 'Basic' level access. Master level access would allow more complex and security critical tasks to be carried out by the engineer, such as updating system software and inserting new components, whereas basic level access would allow access to the interior for basic maintenance.

SUMMARY OF INVENTION

According to a first aspect of the invention, there is provided a method of controlling access to a processing device comprising: providing an access token with a machine readable identity; reading the identity of the access token at the location of the processing device; and if the identity is a valid identity, determining the associated access permission level for the access token and allowing a level of access to the processing device according to the associated access permission level.

In one embodiment the access permission level is held in the access token.

Alternatively, the access permission level for an access token is held at a remote site and accessed via a secure network, although the insecurity inherent in such a system make the former embodiment preferable.

In an embodiment the processing device may hold a database of allowed functionality versus access permission level so that the processing device can determine the functionality allowed to each user with a specific access token associated with a specific access permission level.

Passwords can be held both remotely and in the access tokens (Flex disk with encrypted file or secure USB fob). The remote database is always accessed for set up and administration, but it need not be used for accessing a processing device if a database of access level permissions is also stored in the processing device. The access process also checks an entered password against stored in the access token In some embodiments, the method further comprises determining an authorized access time period for the access token and allowing access to the processing device only if the current time is within the authorized access period. In one embodiment, the attempt to access the processing device is an attempt to access the service software of the device.

According to a second aspect of the invention, there is provided a system for validating an attempt to access a processing device comprising: a plurality of access tokens having a machine readable identity; at least one processing device comprising an access token reader arranged to read an identity of an access token, wherein the processing device is arranged to read the machine readable identity from an access token, to validate the identity and, if the identity is a valid identity, to allow a level of access to the processing device according to the associated access permission level.

In one embodiment, the system comprises a plurality of processing devices, which may be geographically distributed. Controlling access to a plurality of processing devices is complex and therefore the advantages of the present invention may particularly benefit such a system. This is all the more the case for geographically distributed devices as the access tokens for such a system are also likely to be geographically distributed. In such embodiments, the access tokens are preferably portable access tokens.

In one embodiment, the processing device(s) and the memory holding the database are remote from one another and both comprise communication means arranged to allow them to communicate via a network. This allows for a database to be located at a convenient location. The memory may for example be a remote mass storage device.

The processing devices may be high-security devices, for example devices which supply, control or allow for management of high value goods and/or money. An example of a high-security device is an Automated Teller Machine (ATM). Such devices require a high level of protection from dishonest attempts to access the machines. Providing a centralized record of access permission levels provides increased security for access as it may be harder to tamper with (compared to, for example, a portable access token) and can readily be updated by a change in status of the access token or a user thereof (for example if an access token is lost or previously trusted individual leaves the company). Although access tokens such as flex disks, which are triple DES encrypted, or USB keys are secure.

In some embodiments, the system may comprise a password validation means and require a password to be entered to validate access. The password may be held in the database associated with a valid identity, on the access token or in the processing circuitry. The requirement for a password to be entered and validated further improves the security of the system.

In some embodiments, the system may comprise an authorized access time period validation means arranged to validate that the access means is within an authorized access time period. The authorized access time period may be held in the database associated with a valid identity, on the access token or in the processing device. The requirement for authorized access time period validation further improves the security of the system.

In some embodiments, the database may contain sub-areas, with each sub-area relating to a specific class of processing devices. This is convenient as it allows information concerning more than one class of processing devices to be stored in a single location. For example, one sub-area may relate to one type of device (e.g. ATM and non-ATM), or to a variety of different devices such as devices owned by different companies.

According to a third aspect of the invention, there is provided a processing device arranged validate attempts to access a processing device, comprising: an access token reader arranged to read an identity from an access token; and an access level control means arranged to allow a level of access to the processing device according to an access permission level associated with an identity.

In some embodiments, the processing device may be a high-security device, for example devices which supply, control or allow for management of high value goods and/or money. An example of a high-security device is an Automated Teller Machine (ATM).

In other words, the software on the processing device operates according to access permissions which are taken from a valid, authenticated access token. Thus the owner (or holder) of the access token can be allowed access to various aspects of the servicing software for a specific processing device. The servicing software may have many different permissions and each access device can be programmed with any combination of permissions. However for the sake of convenience permissions can be grouped together, for example, basic and master groups. This is advantageous as there are strict security requirements for ATMs and this method allows for the validation of an access device therefore providing protection for the ATM.

In some embodiments, the ATM further comprises a network connection means arranged to allow the ATM to connect to a network. This allows the ATM to query a remote database.

The ATM may further comprise a password validation means arranged to validate a password. This provides a further level of access validation and therefore security for the ATM.

The ATM may further comprise an authorized access time period validation means arranged to validate that the access means is within it authorized access time period. This provides a further level of access validation and therefore security for the ATM.

Any aspect of the invention described above may incorporate features of other aspects of the invention as appropriate and as will be appreciated by the person skilled in the art.

BRIEF DESCRIPTION OF THE DRAWINGS

Embodiments of the present invention will now be described, by way of example, with reference to the accompanying drawings, in which:

FIG. 5 shows a representation of a database; and

DETAILED DESCRIPTION

Figure 1:
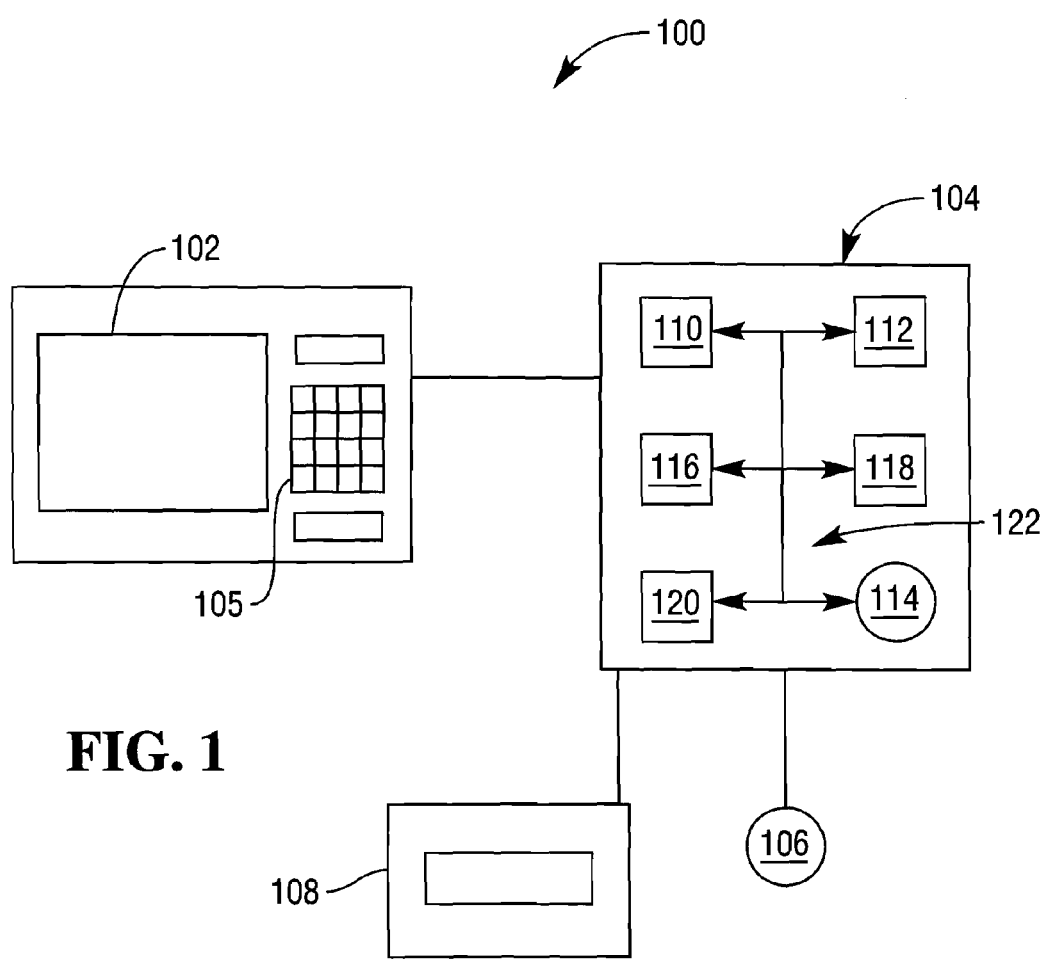
FIG. 1 shows a processing device capable of operating according to one embodiment of the present invention.

The processing device of FIG. 1 is an ATM 100 and comprises a screen 102 arranged to display data and processing circuitry 104 arranged to process data as described in greater detail below. The ATM 100 further comprises input means in the form of a key pad 105, an interface means 106 and a key fob port 108, which may simple be the USB port on the motherboard in the processing device (104).

The processing circuitry 104 comprises a display driver 110, a processing unit 112, a network connectivity port 114, a hard drive 116, a memory 118, an Input/Output (I/O) subsystem 120 and a system bus 122. The display driver 110, processing unit 112, network connectivity port 114, hard drive 116, memory 118 and I/O subsystem 120 communicate with each other via the system bus 122, which in this embodiment is a PCI bus, in a manner well known in the art. In this embodiment, the network connectivity port 114 is an IP port arranged to allow the computer to connect to the Internet but in other embodiments may be a connection to another type of network, such as an intranet.

Such processing circuitry 104 may be provided by a number of different computer systems that are currently available.

Figure 3:
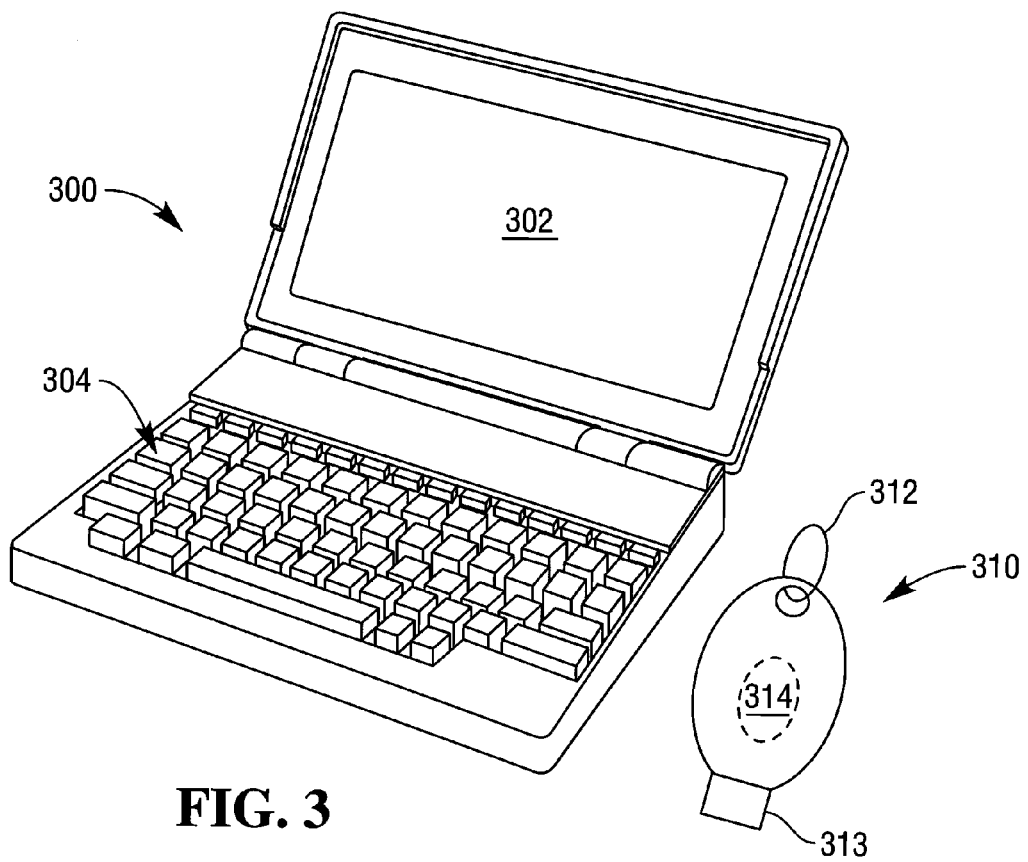
FIG. 3 shows a portable interface unit and an access token in the form of a key fob.

The processing circuitry 104 is arranged to accept inputs from the input means 105, 106, 108. In normal use of the ATM 100, a customer provides inputs using the keypad 105. However, the present invention is concerned with access to the ATM 100 for maintenance and the like. In such instances, the inputs are made via an interface means 106 and an access token port, in this case in the form of a key fob port 108, as is described in greater detail below. The key fob port 108 comprises a USB port, arranged to receive a USB memory device and to allow the processing unit 112 to read data there from. The key fob port 108 and the processing unit 112 provide an access token reader. The interface means 106 allows connection of a portable interface device 300 (as is shown in FIG. 3).

Alternatively, access to the processing device may be gained through an operator panel which is integral to the processing device, as is the norm with Automated Teller Machines and which, as such, will not be described further herein.

The processing unit 112 can communicate with devices external to the processing circuitry 104 via a network connection means provided by the I/O subsystem 120 and the Network connectivity port 114.

Figure 2:
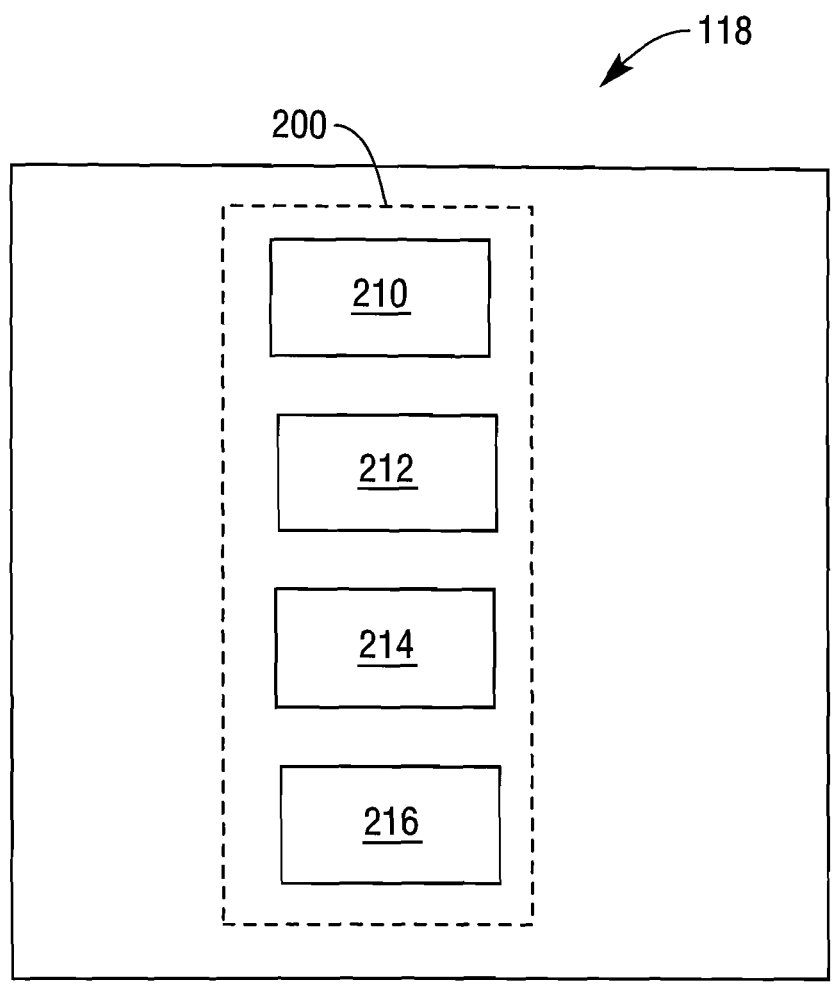
FIG. 2 shows detail of the memory of the processing device shown in FIG. 1.

FIG. 2 shows detail of the memory 118 of the ATM 100. The memory 118 comprises a program storage portion 200, which is allocated to program storage and is used to hold programming code that can be used to control the actions of the processing circuitry 104.

In this embodiment, the program code includes a query means 210, an encryption means 212, a password validation means 214 and an access level control means 216. The functions of these blocks of code will be expanded upon hereinafter.

FIG. 3 shows an input unit comprising a portable interface device in the form of a small laptop computer 300 incorporating a screen 302 and a keyboard 304. As will be familiar to the person skilled in the art, when connected to the interface means 106, (and following validation, as is described below) the portable interface device 300 allows an engineer to interface with the processing circuitry 104, for example running tests or updating system software. As mentioned above this laptop can be replaced by an operator panel which is integral to the processing device. The laptop may be used in situations where the cost of providing each processing device with an operator panel is prohibitive.

The access token 310, which is illustrated in FIG. 3 along with the laptop, also comprises a key fob 310, which comprises a ring 312 arranged to be attached to a key ring or other keys and a USB connection means 313 arranged to interface with the processing circuitry 104 via the key fob port 108. The key fob 310 comprises a memory chip 314, on which is stored an identity. This identity can be read by a suitable reader, such as by the processing unit 112 via the key fob port 108.

Figure 4:
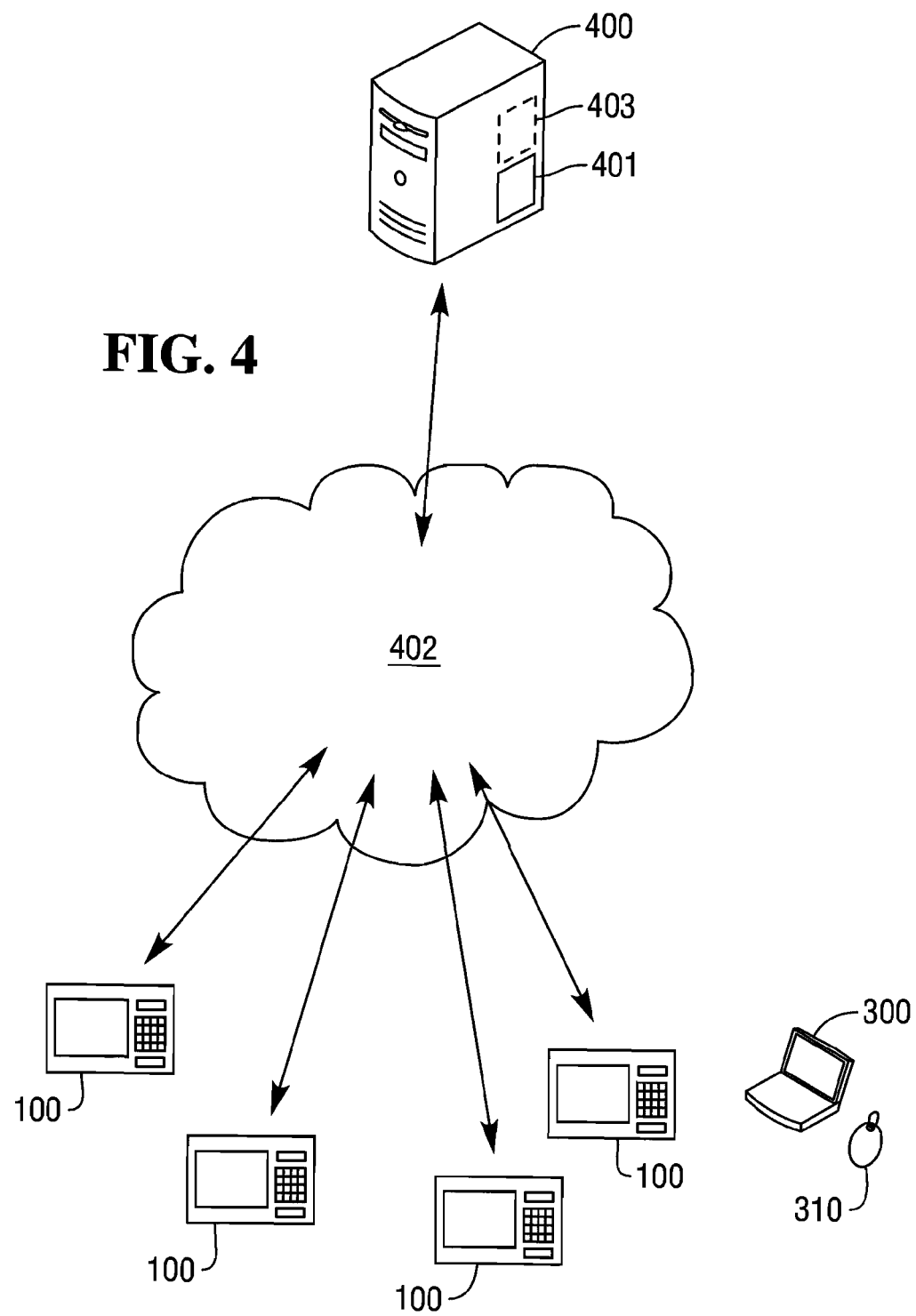
FIG. 4 shows a network incorporating the processing device of FIG. 1 and a mass storage device.

FIG. 4 shows a network comprising a plurality of ATMs 100 connected to a mass storage device 400 via the Internet 402. In this embodiment, the mass storage device 400 comprises an array of magnetic storage means and stores a database, in this embodiment, an SQL database. As will be familiar to the person skilled in the art, 'mass storage' refers to the storage of large amounts of information in a persisting (non-volatile) and machine-readable fashion and can be accomplished using various types of memory (SQL is an abbreviation of Structured Query Language and is standardized query language for requesting information from a database).

The mass storage device 400 comprises a network connection means 401 which allows it to communicate with other devices via the internet and code comprising an authorized access time period validation means 403.

Figure 6:
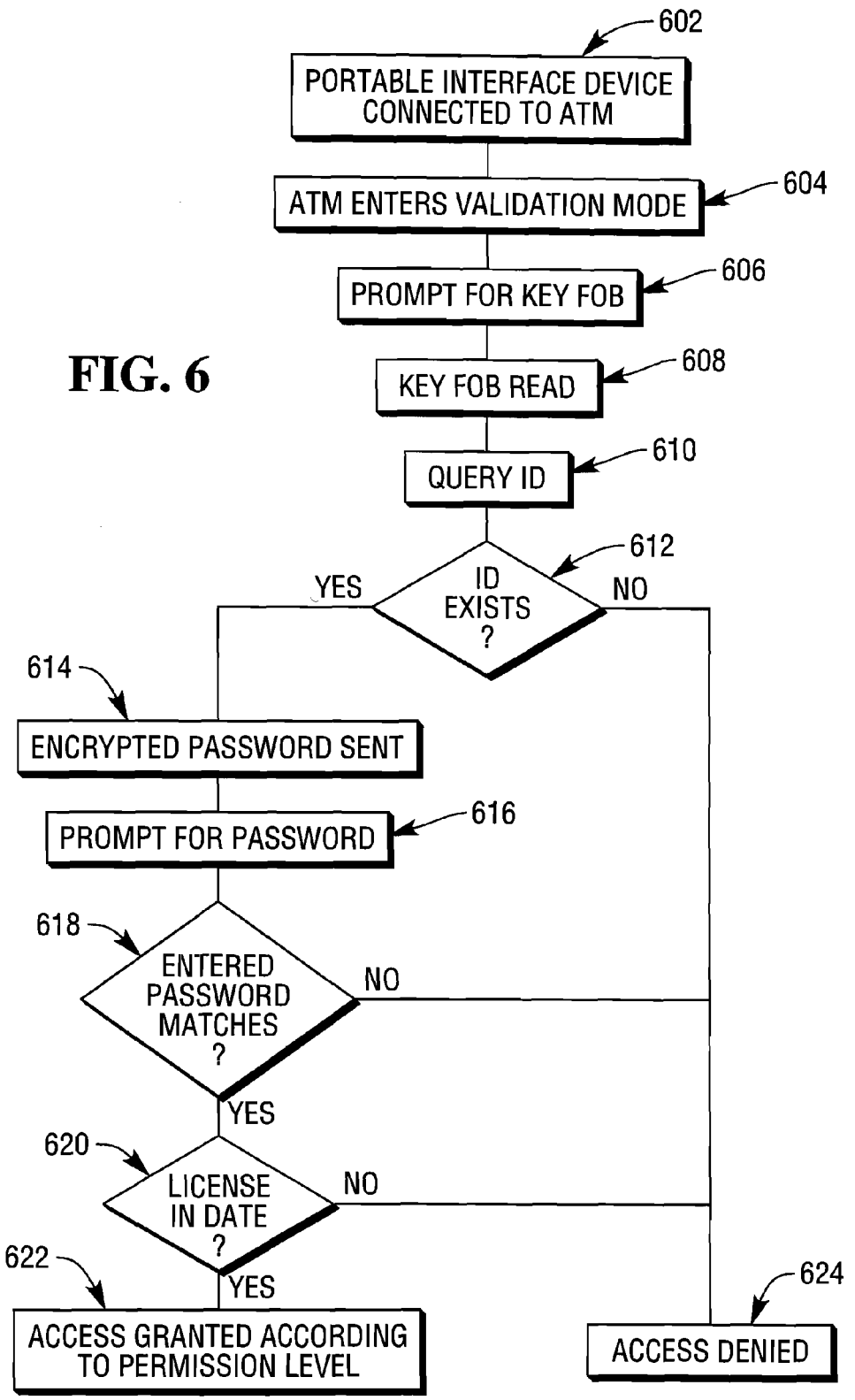
FIG. 6 shows a flowchart of steps in the process of validating an engineer's identity.

A representation of an extract from a database 500 held on the mass storage device 400 is shown in FIG. 5. In this embodiment, the database 500 contains the identity associated with each authorized key fob 310 in association with the start and expiration dates of the license issued to that key fob 310 holder, a password associated with the key fob 310 and a permission level. The password associated with the access device or key fob 310 is also stored on the key fob 310 and can also be stored in a separate database in each processing device to which the key fob 310 allows access. As mentioned above, accessing the processing device may require querying the local database on the processing device or may require accessing the remote database depending on the specific set up chosen by the operator. If the localized database system is utilized the remotely stored database can be used for access device updates In use of the system, (as is now described with reference to FIG. 6), a field engineer connects his or her portable interface device 300 to the interface means 106, or activates the integral operator panel on the ATM, (step 602). This causes the processing circuitry 104 to enter a validation mode (step 604). The field engineer is then prompted via the screen 302 of the portable interface device 300, or operator panel, to insert the USB connection means 313 of his or her key fob 310 into the key fob port 108 (step 606).

Once the key fob 310 is provided thereto, the processing unit 112 reads the identity (ID) from the memory chip 314 of the key fob 310 via the key fob port 108 (step 608). This in turn causes the processing unit 112 to utilize the query means 210 to formulate an SQL query, which is transmitted via the network connectivity port 114, the Internet 402 and the network connection means 401 to the mass storage device 400 (step 610). The mass storage device 400 accesses the database 500 in an attempt to retrieve information relating to the ID read from the Memory chip 314 (step 612). If there is data corresponding to the ID, the mass storage device 400 sends a message to the processing unit 112 which includes an encryption of the password stored in conjunction with the ID (step 614). Receipt of this message causes the processing unit 112 to prompt the field engineer to enter a password (step 616). The field engineer enters the password, which is then encrypted by the encryption means 212 and the encrypted entered password is compared with the encrypted password supplied by the mass storage device 400 and it is determined whether the entered password is a match to the stored password using the password validation means 214 (step 618). As is known to the person skilled in the art, the use of encryption helps to maintain the security of the system as it prevents the password from being transmitted in a readable format. A variety of known encryption techniques could be utilized for this purpose. In addition, the password, to be entered by the user, may be stored in the key fob thus negating the need for network access or updating of each processing device if a password changes.

The mass storage device 400 accesses the expiration date of the license associated with the key fob from the database and compares it to the actual date using the authorized access time period validation means 403 (step 620). The mass storage device 400 then sends the processing unit 112 a message indicated if the license is within its dates. The license dates provide an indication of an authorized access period. As with the password this information can also be stored on the key fob.

If the passwords match and the license is in date, then the field engineer is allowed to access the processing circuitry 104 of the ATM 100 for maintenance according to the a permission level stored by the mass storage device 400 (step 622). Otherwise, no access is granted (step 624).

In this embodiment there are two levels of permission, "Basic", which allows access to a sub-set of protected service software functionality and "Master" which allows access to all protected service software functionality defined at the time that a specific version of the service software is released. However, in other embodiments, it is possible to have individual permissions (i.e. a permission defined for a single field engineer). Also, it is possible to create different groups, with specific permissions, such as trainee engineers.

The level of access to the ATM is controlled by the access level control means 216. This 'permission level' will be experienced by the engineer as a limitation of the options open to him or her. In practical terms, the engineer with 'Basic' level may not be presented with options that a 'Master' engineer would see, or may see these options 'greyed-out' or with their inputs disabled.

In one embodiment the permission levels may be written to the access device and uploaded to the processing device as part of the access process.

As will be appreciated by the skilled person, by categorizing various group permissions on a mass storage device 400, rules for which individual engineers are granted what level of access permission can be held centrally, i.e. in the mass storage device 400, and not on the key fob 310, interface device 300 or other access tokens or on the ATM or other processing devices. This means that the appropriate level of protection can be readily applied without, for example, requiring access tokens or the software on individual processing devices to be re-programmed.

It will be appreciated that there are many variations to the above described embodiment which are within the scope of the invention. For example, the database could contain additional criteria which must be fulfilled before allowing access to a machine. There may for example be more than one type of machine (ATM and non-ATM, a variety of different ATM's such as ATMs owned by different companies) and the access token ID may be required to be associated with the type of device being accessed before access is granted. Further, steps described above as being executed on the mass storage device 400 could instead be performed on the ATM and vice versa. Alternatively, other processing means could be utilized to carry out one or more of the steps. For example, as described above, the database may be stored locally in the processing device, in which case the system works as above with the exception that no network communication is required.

In the above embodiment, the password was stored on the mass storage device 400, but in other embodiments it could be stored on the access token or in the processing circuitry of the ATM, for example in encrypted form. The same could be true for the license dates—for example, as with the prior art access tokens, the license period is held on the access token in the form of a length (in months) and an expiry date. In the above embodiment, the password was validated by processing circuitry 112 on the ATM and the license data was validated by the authorized access time period validation means 403 on the mass storage device 400. However, the system could be arranged such that both these validation steps could be carried out by one or the other device, or indeed by a further processing device.

The above embodiment comprises two levels of access permission but other embodiments could comprise more levels, for example a 'parts replacement' permission, which allows an engineer to replace parts—this is an extremely security sensitive operation and may therefore require extra control. Alternatively or additionally, individual permission levels for one or all engineers could be provided.

What is claimed is:

1. A method of controlling access to a processing device comprising:
    providing an access token with a machine readable identity embedded in a key;
    reading the identity of the access token by the processing device;
    when the identity is a valid identity, determining by the processing device an access level and a permission level including an authorized task associated with the identity and license dates providing an indication of an authorized access period;
    obtaining an encrypted stored password from a key fob;
    acquiring a password entered from a user; and
    allowing the access level to the processing device according to the permission level by the processing device when a decrypted version of the encrypted stored password obtained from the key fob matches the password entered from the user, wherein there are two levels of permission, basic, which allows access to a sub-set of protected service software functionality and master, which allows access to all protected service software functionality defined at the time that a specific version of the service software is released.

2. A method according to claim 1, wherein the permission level is held in the access token and read by the processing device.

3. A method according to claim 1 in which the permission level is stored in a remote location and accessed via a secure network.

4. A method according to claim 1, which further comprises determining an authorized access time period for the access token and allowing access to the processing device only if the current time is within the authorized access period.

5. A method according to claim 1, in which an attempt to access the processing device is an attempt to access the service software of the device.

6. A system for validating an attempt to access a processing device comprising:
    a plurality of access tokens having a machine readable identity, the access tokens embedded in a key fob;
    the at least one processing device comprising an access token reader arranged to read an identity of an access token,
    wherein the processing device is arranged to read the machine readable identity from an access token, to validate the identity and obtain an encrypted stored password for a user from the key fob, and when the identity is a valid identity, to determine an access level and a permission level, including an authorized task, associated with the access level and license dates providing an indication of an authorized access period, and to allow the access level to the processing device according to the permission level when an entered password from the user matches a decrypted version of the encrypted stored password obtained from the key fob, wherein there are two levels of permission, basic, which allows access to a sub-set of protected service software functionality and master, which allows access to all protected service software functionality defined at the time that a specific version of the service software is released.

7. A system according to claim 6, wherein the permission level is held in the access token and read by the processing device.

8. A system according to claim 6 in which the permission level is stored in a remote location and accessed via a secure network.

9. A system according to claim 6 which comprises a plurality of processing devices, which are geographically distributed.

10. A system according to claim 6 in which the access tokens are portable access tokens.

11. A system according to claim 6 in which the access tokens comprise an interface device arranged to allow the user to interact with the processing device.

12. A system according to claim 6 in which the processing device is a high-security device.

13. A system according to claim 6 which comprises a password validation means and requires a password to be entered to validate access.

14. A system according to claim 6 which comprises an authorized access time period validation means arranged to validate that the access token is within an authorized access time period.

15. A processing device arranged to validate attempts to access the processing device for maintenance by a user, the processing device comprising:
    an access token reader arranged to read an identity from an access token, the access token embedded in a Universal Serial Bus (USB) device; and
    an access level control means arranged to allow an access level to the processing device according to a permission level, including an authorized maintenance task to be performed by the user and license dates providing an indication of an authorized access period, associated with an identity;
    wherein the access level control means is arranged to read the machine readable identity from an access token, send a request to a database for information associated with the identity and to receive the information from the database, and the access control means arranged to obtain an encrypted stored password for the user from the USB device and to decrypt the encrypted stored password, the access level control means further arranged to obtain an entered password from the user and when the entered password matches the decrypted password to determine the access level and the permission level associated with the identity, and to allow the access level to the processing device according to the permission level, wherein there are two levels of permission, basic, which allows access to a sub-set of protected service software functionality and master, which allows access to all protected service software functionality defined at the time that a specific version of the service software is released.

16. A processing device according to claim 15, wherein the permission level is held in the access token and read by the processing device once the access token has been validated.

17. A processing device according to claim 15 in which the permission level is stored in a remote location and accessed via a secure network.

18. A processing device according to claim 15 which is a high-security device.

19. A processing device according to claim 18 which is an Automated Teller Machine.

20. A method of controlling maintenance access to a processing device comprising:
   reading an identity within an access token by the processing device, the access token acquired from a Universal Serial Bus (USB) key fob;
   sending a request for information associated with the identity to a database remote from the processing device via a secure network by the processing device, the information including a stored password, a license period and a permission level including an authorized software service maintenance task to be performed by a user and license dates providing an indication of an authorized access period;
   receiving the information from the database by the processing device, including an encryption of the stored password;
   obtaining an encrypted stored password for the user from the USB device;
   decrypting the encrypted stored password to obtain a decrypted the password;
   recording entry of entered password supplied by the user;
   comparing the entered password to the decrypted password by the processing device;
   determining whether a current date is within the license period by the processing device; and
   allowing user access by the processing device to service software of the processing device according to the permission level when the entered password matches the decrypted password and the current date is within the license period, wherein there are two levels of permission, basic, which allows access to a sub-set of protected service software functionality and master which allows access to all protected service software functionality defined at the time that a specific version of the service software is released.

* * * * *